(12) United States Patent
Harris

(10) Patent No.: US 7,052,200 B2
(45) Date of Patent: May 30, 2006

(54) RESILIENT DECK BOARD FASTENER

(76) Inventor: G. Steven Harris, 4915 W. 120th Pl., Overland Park, KS (US) 66209-3559

( * ) Notice: Subject to any disclaimer, the term of this patent is extended or adjusted under 35 U.S.C. 154(b) by 230 days.

(21) Appl. No.: 10/668,879

(22) Filed: Sep. 23, 2003

(65) Prior Publication Data

US 2005/0063771 A1    Mar. 24, 2005

(51) Int. Cl.
*B25G 3/00* (2006.01)
(52) U.S. Cl. ............... 403/231; 403/232.1; 403/408.1; 52/483.1
(58) Field of Classification Search .......... 403/403, 403/292, 294, 286, 220, 169, 231, 232.1, 403/408.1; 52/177, 178, 179, 180, 181, 262, 52/263, 264, 265, 483.1, 650.3; D8/382; 405/218

See application file for complete search history.

(56) References Cited

U.S. PATENT DOCUMENTS

| | | | | |
|---|---|---|---|---|
| 695,722 | A * | 3/1902 | Heilmann | 52/509 |
| 4,557,219 | A * | 12/1985 | Edwards | 425/472 |
| 5,193,931 | A * | 3/1993 | Arato | 403/231 |
| 5,359,954 | A | 11/1994 | Kordelin | |
| 5,386,426 | A * | 1/1995 | Stephens | 372/20 |
| 5,529,428 | A * | 6/1996 | Bischof | 403/408.1 |
| 5,623,803 | A | 4/1997 | Willis | |
| 5,660,016 | A | 8/1997 | Erwin et al. | |
| D384,271 | S * | 9/1997 | Kozyrski | D8/382 |
| 5,730,544 | A | 3/1998 | Dils et al. | |
| 6,129,053 | A * | 10/2000 | Markham et al. | 119/710 |
| 6,314,699 | B1 | 11/2001 | West | |
| 6,402,415 | B1 | 6/2002 | Eberle, III | |
| 6,634,077 | B1 * | 10/2003 | Layfield | 29/525.13 |
| D485,160 | S * | 1/2004 | Pelc | D8/382 |
| 6,835,929 | B1 * | 12/2004 | Finch | 250/288 |
| 6,851,884 | B1 * | 2/2005 | Eberle | 403/231 |
| 6,854,221 | B1 * | 2/2005 | Michaels | 52/102 |
| 2001/0027829 | A1 | 10/2001 | Crout | |
| 2002/0059766 | A1 | 5/2002 | Gregori | |

* cited by examiner

*Primary Examiner*—Daniel P. Stodola
*Assistant Examiner*—Nahid Amiri
(74) *Attorney, Agent, or Firm*—Berenato, White & Stavish LLC

(57) ABSTRACT

A fastener for securing deck boards to a support structure without the need for driving screws or nails through the deck boards. The fastener includes two horizontal flanges that fit into slots cut into the sides of adjacent deck boards, a center hole for securing the fastener to the support structure and deformable, resilient elements that bridge the gap between adjacent deck boards during fastening yet compress inward when the boards swell and expand.

15 Claims, 12 Drawing Sheets

RESILIENT DECK BOARD FASTENER

FIELD OF THE INVENTION

The present invention relates to fastener for fastening deck boards to supporting structures and more particularly to a deck fastener for securing adjoining deck boards to a common joist.

BACKGROUND OF THE INVENTION

Conventional decks typically include horizontal floors raised above the ground and supported by an underlying structure. Decks are often attached to adjacent residential or commercial buildings. Deck boards are placed side by side during construction of a deck, and are typically arranged to cross the structures, such as joints at an angle perpendicular to the longitudinal axis of the joist. Other structures utilizing similar flooring techniques include boat docks, ramps, stairs, landings, bridges, platforms and for structures for surrounding or enclosing swimming pools and hot tubs.

Typically, decks are constructed to withstand exposure to the elements and are often constructed from pressure treated wood, plastic or, more recently, exotic hardwoods. Whether the deck boards, which form the flooring of the deck, are comprised of wood or plastic or other material, the substructure is typically formed of commonly available pressure treated lumber. The substructure is formed with joists and headers attached to posts. The deck boards are typically fixed transversely across the joists to the substructure, in a generally parallel relationship, by way of nails or screws, driven through the upper surface of the deck board into the joist below.

This manner of attaching deck boards to the substructure presents several disadvantages. If nails or screws are used, they typically cause discoloration of the surrounding wood surface over time. In addition, in driving the nail through the wood or plastic deck board, the surface of the board is often marred during hammering, causing unsightly dents and scratches to the top surface of the board. Both the discoloration of the wood and marring of the surface are of particular concern when exotic hardwoods are used.

In addition, nails have a tendency to work themselves loose from the board over time, projecting upward from the board's surface. Not only is this aesthetically unpleasing, it causes the deck board to loosen against the joist and also constitutes a safety hazard, particularly to individuals walking over the deck surface barefoot. In addition, both nails and screws are prone to rusting over time, causing failure to the attachment. Removal of one or more deck boards entails prying the nails loose which is both time consuming and causes damage to the surface of the board.

Since decks are constantly exposed to outside environmental conditions, the deck boards are exposed to extremes of both temperature and humidity. Both plastic and wooden deck boards will shrink and expand in response to temperature changes, and wooden deck boards will also shrink and expand as the moisture content of the board increases or decreases. Deficiencies in the attachment means in the prior art often cause attachment devices to loosen over time or to cause the deck boards to warp or crack because the attachment device does not provide for movement along with the board as it expands or contracts.

BRIEF SUMMARY OF THE INVENTION

It is therefore an object of the present invention to provide a deck fastener that provides easy installation and removal of deck boards, avoids the difficulties presented by attachment devices in the prior art, provides for expansion and contraction of the boards after installation, and in particular, provides for post-installation expansion of adjoining deck boards.

In the construction of a deck or similar structure, the supporting substructure is built from weather resistant materials, typically pressure treated lumber, including vertical posts secured to the ground, spaced parallel joists extending between the posts, headers spanning the posts and connecting the ends of the joists to one another, and deck boards fixed transversely to the top of the joists to form a platform. While the substructure is generally comprised of pressure treated wood, the deck boards may be formed from pressure treated wood, plastic, exotic hardwoods or other resilient material.

The present invention includes a fastener for securing deck boards to a support structure without the need for driving screws or nails through the deck boards. The fastener includes two horizontal flanges that fit into slots cut into the sides of adjacent deck boards, a center hole for securing the fastener to the support structure and deformable, compression elements that bridge the gap between adjacent deck boards during fastening yet compress inward when the boards swell and expand.

To install deck boards, using a fastener of the present invention, slots are cut into the sides of the deck boards at the point where the deck board crosses an underlying joist. The slots are preferably two and one-half inches wide, one-half inch deep and one-eighth inch tall. The slots may be cut using known woodworking tools such as a biscuit joiner.

The fastener includes two flat, relatively narrow flanges that project or extend outward and fit into the slots of adjacent deck boards. The boards are then held in place by driving a screw or nail into the center hole of the device into a joist below. In order to facilitate use of the fastener during deck construction and to provide a means of assuring even gaps between boards throughout the deck structure, the device typically includes top and bottom tabs that project from the top and bottom of the flat horizontal surface of the device. These tabs also serve to stabilize the fastener when it is inserted into the slot of the first deck board, prior to engaging the adjacent board and subsequent fastening with a screw or nail. The device serves not only as an attachment means, but as a gauge to assure that gaps are evenly spaced throughout the deck to yield a more pleasing appearance.

Because the gap between adjacent boards will narrow or expand as a deck board responds to environmental conditions, compression elements may be integral with the tabs so that after installation the tab structure may compress in response to movement of, and pressure exerted by, the expanding boards. As the boards adjacent to the fastener expand in width, the compression elements deform to adopt a narrower profile. If the compression elements are formed of a flexible, resilient material such as plastic, they will tend to expand to fill the gap as it widens in response to subsequent shrinkage of the deck boards.

BRIEF DESCRIPTION OF THE DRAWINGS

The above features and advantages of the invention will become apparent from a consideration of the subsequent detailed description presented in connection with the accompanying drawings, in which.

DETAILED DESCRIPTION

Figure 1:
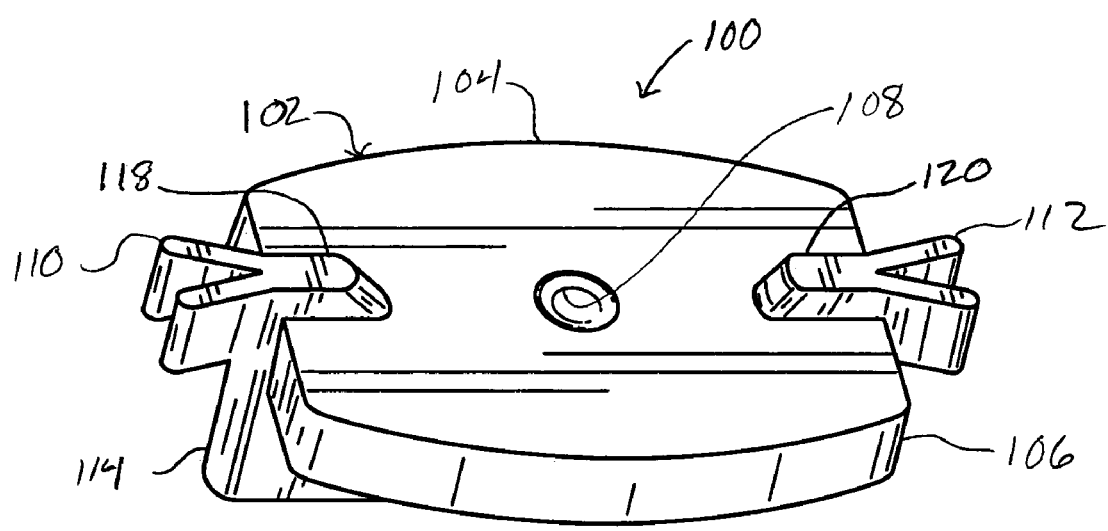
FIG. 1 is a perspective view of a deck board fastener in accordance with the principles of the present invention.

Turning to the drawings, preferred embodiments of the device will be described by reference to the drawing figures wherein like numerals indicate like parts.

FIG. 1 provides a perspective view of a deck board fastener 100 in accordance with the principles of the present invention. The fastener 100 includes a horizontal top plate 102 having a first flange 104 and a second flange 106 projecting horizontally from the longitudinal axis of the top plate 102. The fastener 100 also includes a hole 108 extending through the center vertical axis of the top plate 102. As illustrated in FIG. 1, a first compression element 110 projects horizontally outward from the left edge of the top plate 102. A second compression element 112 projects horizontally outward from the right edge of the top plate 102.

Figure 3:
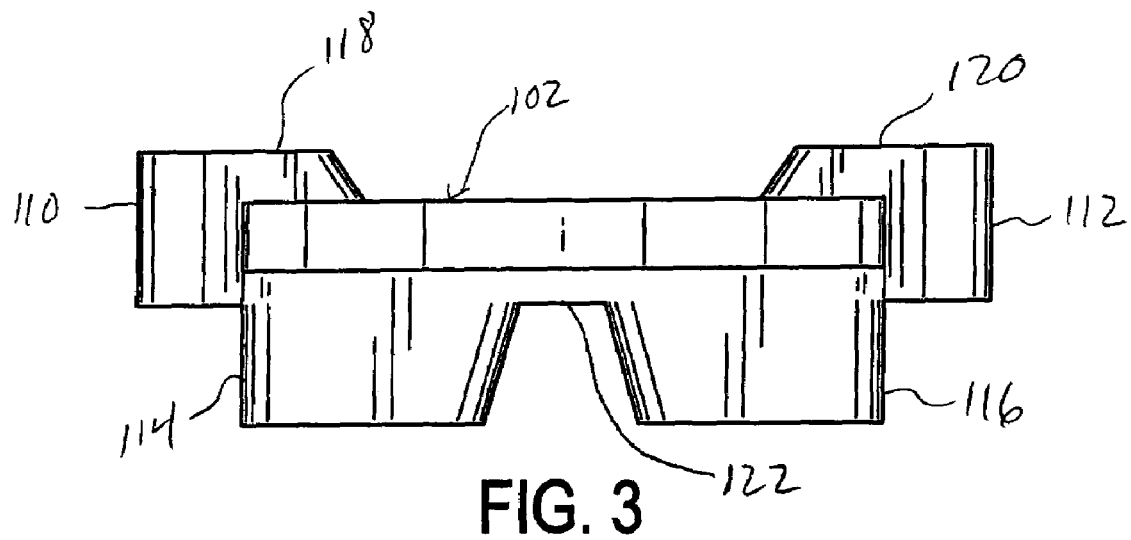
FIG. 3 is a side elevational view of the deck board fastener of FIG. 1.

FIG. 3 is a side elevational view of the fastener 100 of FIG. 1. As illustrated, a first bottom tab 114 and a longitudinally opposed second bottom tab 116 project downward from the bottom surface of the top plate 102. A first top tab 118 and a longitudinally opposed second top tab 120 project upward from the top surface of the top plate 102. The first compression element 110 projects from the left side of the top plate 102, the second compression element 112 projects from the right side of top plate 102. In this embodiment, the top and bottom tabs are integral with the compression elements 110 and 112.

Figure 4:
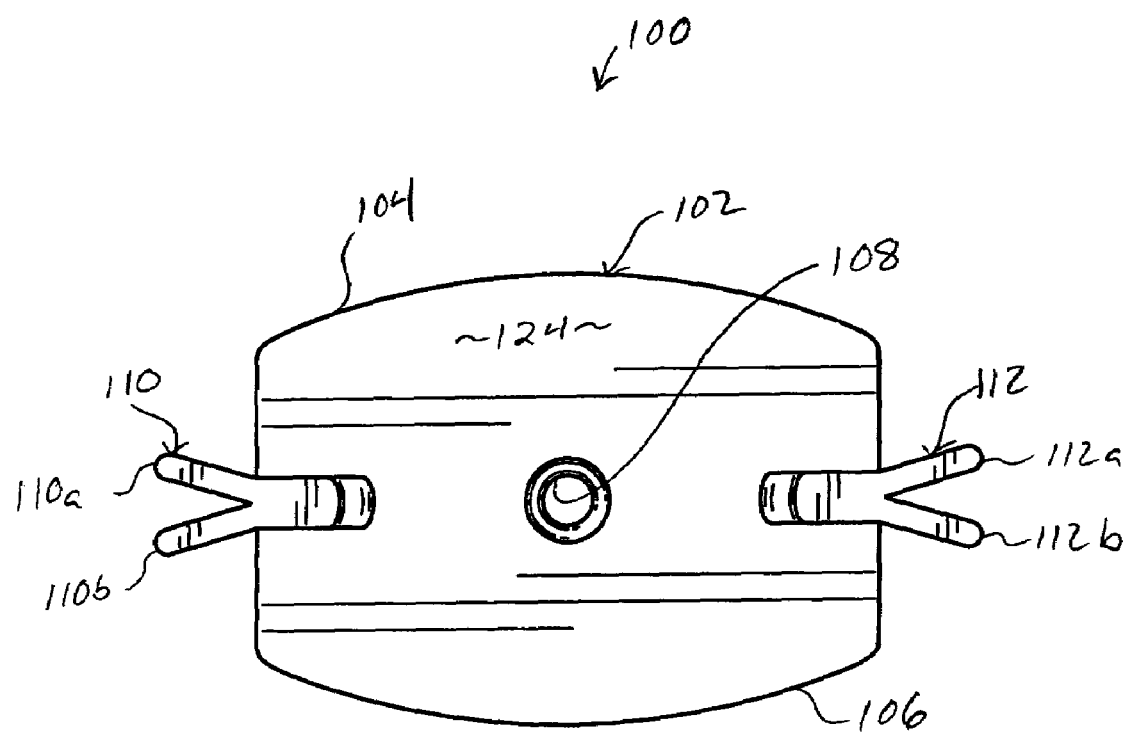
FIG. 4 is a top plan view of the deck board fastener of FIG. 1.

FIG. 4 is a top plan view of the fastener 100 of FIG. 1. FIG. 4 illustrates the top surface 124 of the top plate 102, as well as the first and second flanges 104, 106, the center hole 108, and first and second compression elements 110 and 112. As can be readily seen in FIGS. 1 and 4, compression element 110 includes transversely spaced prongs 110a and 110b. Compression element 112 includes transversely spaced prongs 112a and 112b.

Figure 2:
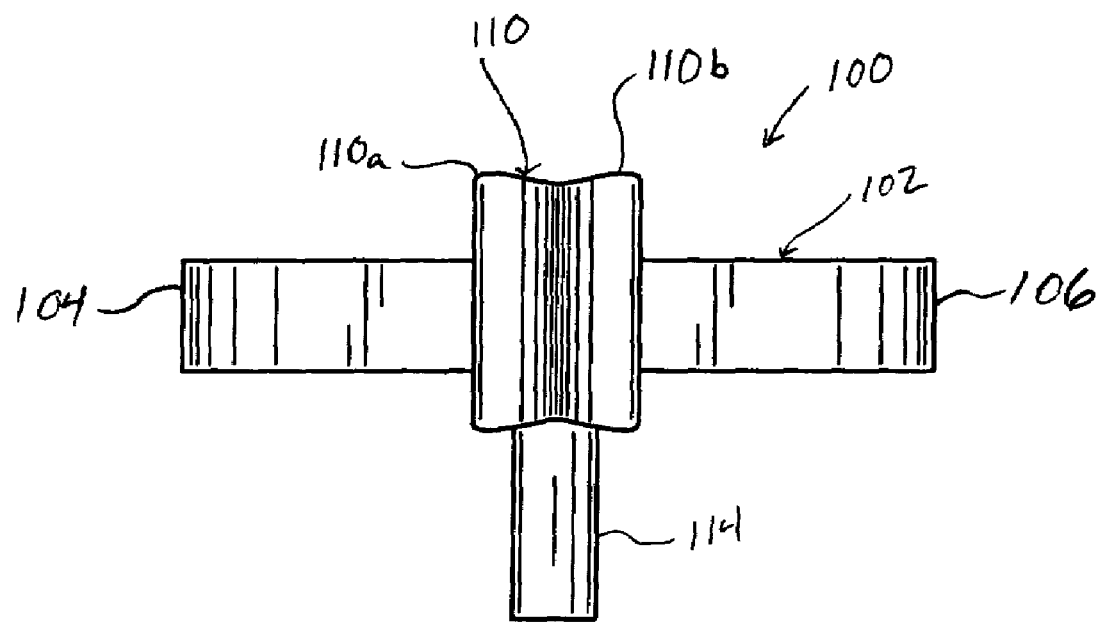
FIG. 2 is an end elevational view of the deck board fastener of FIG. 1.

FIG. 2 is an end elevational view of the fastener 100 of FIG. 1 illustrating end views of the top plate 102, first bottom tab 114, and first compression element 110. The view of compression element 110 is drawn in perspective rather than as a true elevation in order to convey the curvature and depth of space between the prongs 110a and 110b.

Figure 5:
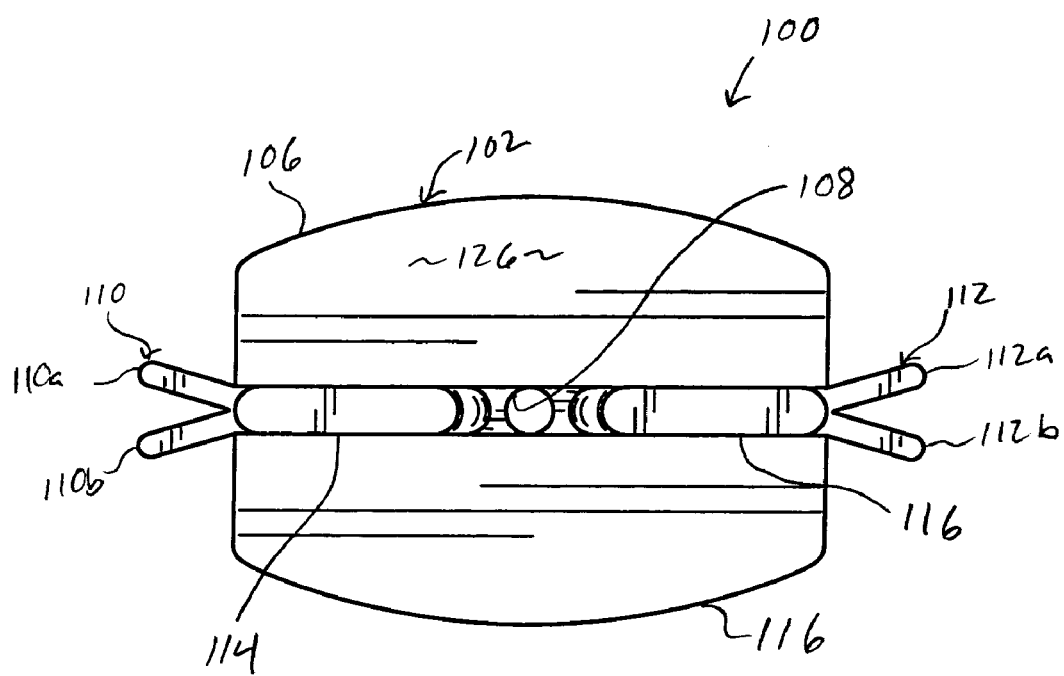
FIG. 5 is a bottom plan view of the deck board fastener of FIG. 1.

FIG. 5 is a bottom plan view of the fastener 100 of FIG. 1 illustrating the bottom surface 126 of top plate 102, the first and second flanges 104 and 106, the center hole 108, the bottom surfaces of the bottom tabs 114 and 116, and first and second compression elements 110 and 112.

Figure 6:
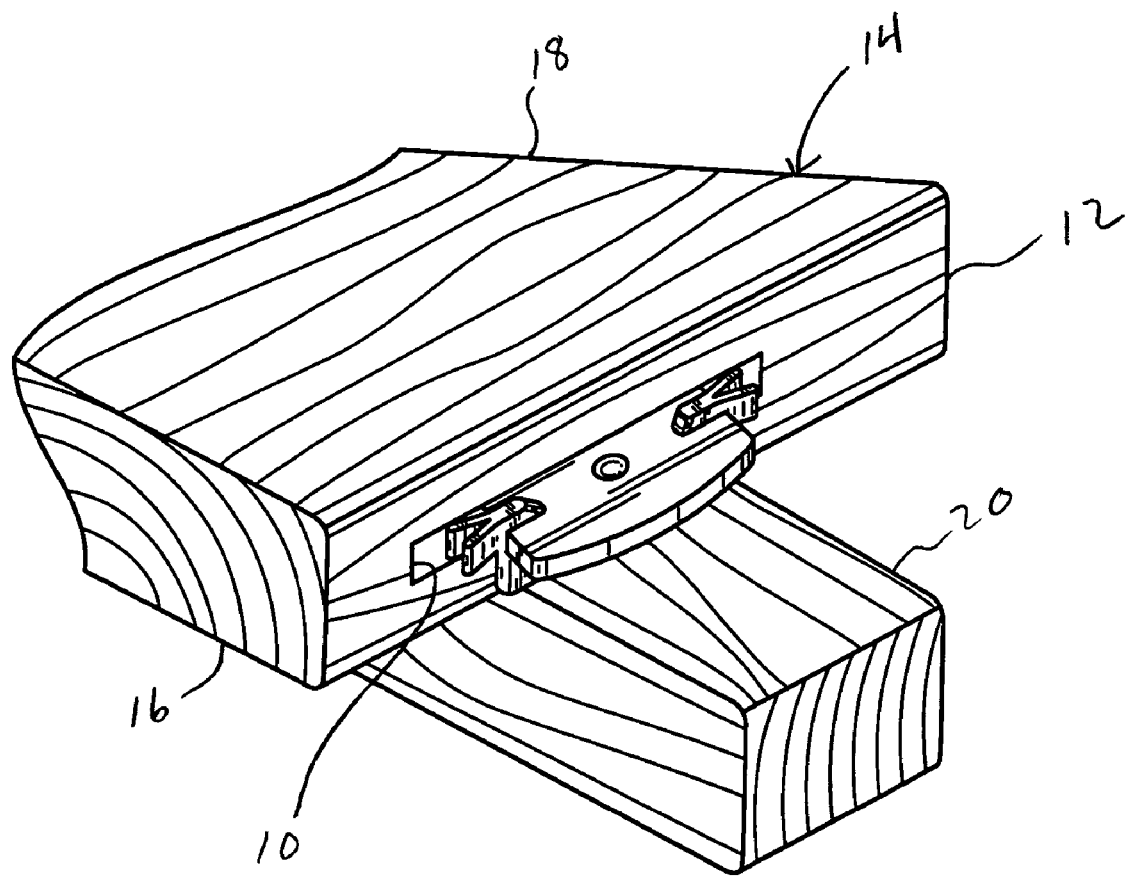
FIG. 6 is a reduced perspective view of a deck board fastener positioned for attachment to a joist.

The top plate 102 is preferably approximately ⅛ inch in vertical thickness to fit the typical dimensions of a slot 10 cut by a biscuit joiner, see FIG. 6. In order to fit within the semicircular profile of the slot formed by a biscuit joiner, the outer margins of the flanges 104 and 106 may be similarly curved, see FIGS. 4 and 5. The top tabs 118 and 120, and/or compression elements 110 and 112, preferably project approximately ⅛ inch upward from the top surface 124 of the top plate 102. The bottom tabs 114 and 116 preferably project ⅜ inch downwards from the bottom surface 126 of the top plate 102. These vertical dimensions will tend to place the slot 10 near the vertical center of an edge 12 of a deck board 14. In the case of typical "one-by" lumber, which is approximately ¾ inches in thickness, the slot 10 will be located approximately ⅜ inches from the bottom surface 16 of the board 14, and ⅜ inches from the top surface 18 of the board 14, leaving approximately a ⅛ inch clearance between the top surface of the top tabs 118 and 120 (and/or compression elements 110 and 112) and the top surface 18.

Figure 8:
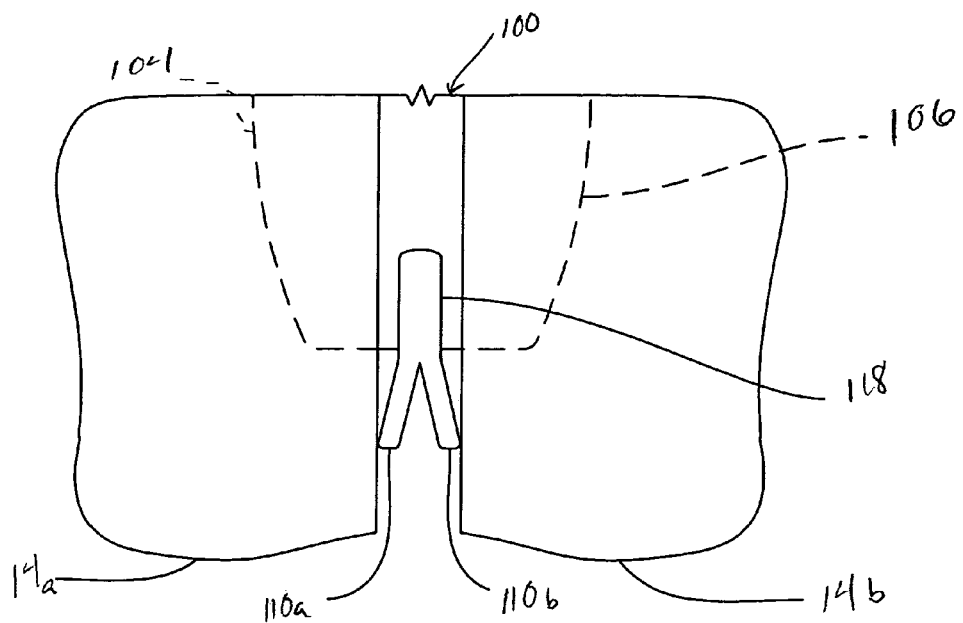
FIG. 8 is a partial, top diagrammatical view of a deck board fastener as initially positioned between adjacent deck boards immediately subsequent to installation.

In use, a first flange 104 of a deck board fastener 100 is inserted into a slot 10 in the side 12 of a deck board 14, see FIGS. 4 and 6. A second deck board is then brought alongside the first so that the second flange 106 is moved into the slot of the second deck board. FIG. 8 shows a fastener 100 with two adjacent deck boards, 14a and 14b, positioned so that the flanges of the fastener 100 are inserted into the slots of the boards. An attachment means such as a nail or screw (not shown) is then driven downward through the center hole 108 of the top plate 102 and into an underlying support structure such as a joist 20. The fastener 100 is thereby secured against the top surface of the underlying joist 20. Preferably, the nail or screw is driven through the fastener 100 at an angle substantially perpendicular to the top surface 124 of the top plate 102. It is typically not necessary or desired to drive the nail or screw at an angle such that it passes through one of the deck boards. Downward pressure exerted by the flanges 104 and 106 is transmitted to the lower surfaces of the slots 10, thereby holding the deck boards 14a and 14b against the joist 20. Therefore, as the fastener 100 is secured to the joist 20, the flanges 104 and 106 of the fastener 100 likewise fasten the deck boards 14a and 14b to the joist 20.

Figure 7:
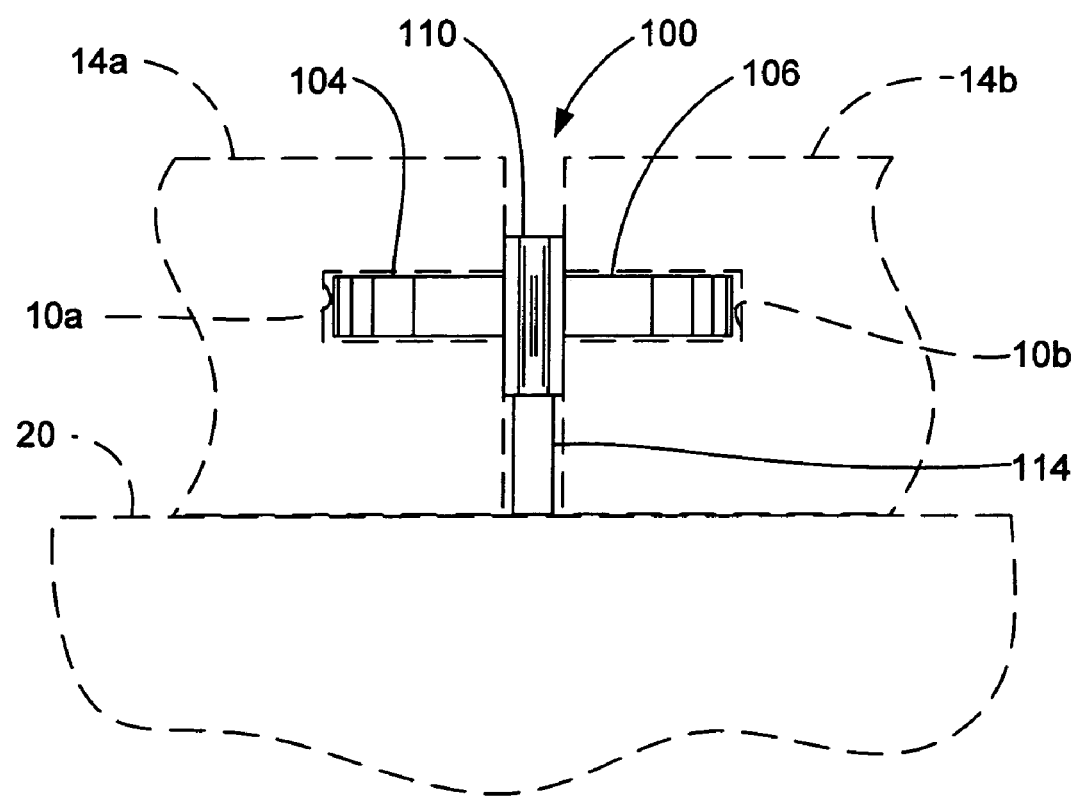
FIG. 7 is an end view of a deck board fastener positioned between two adjacent deck boards drawn in phantom lines.

Preferably, the fastener 100 is formed so that upon installation a ¼ inch gap remains between adjacent boards that are joined by the fastener 100. As may be readily observed through reference to FIGS. 4, 5, 6 and 8, the prongs of the compression elements 110 and 112 may act to limit the width of a gap between adjacent deck boards. As shown in FIG. 3, the compression elements 110 and 112 have an overall vertical height that exceeds the vertical thickness of the top plate 102. It is important that the compression elements 110 and 112 are of sufficient vertical height to bridge the slot 10 in the side of a deck board 14, see FIG. 7. FIG. 7 is an end view of the fastener 100 positioned between two adjacent deck boards 14a and 14b drawn in phantom lines. As illustrated, compression element 110 extends both above and below the adjacent slots 10a and 10b. Bottom tabs (see 114) typically rest upon the upper surface of the underlying joist 20. FIG. 7 also illustrates approximate placement of the flanges 104 and 106 within the slots 10a and 10b, respectively. It should be appreciated that the slots 10a and 10b have been illustrated slightly oversized in order to show both the walls of the slots and the surfaces of the flanges 104 and 106. In practice, at least the bottom surfaces of the flanges 104 and 106 are in contact with the bottom surfaces of the slots 10a and 10b.

As can be seen in FIG. 8, when the fastener 100 is inserted into the slots of adjoining deck boards 14a and 14b, the outer edges of the prongs 110a and 110b are in contact with the inner edges of the boards 14a and 14b, thereby setting the width of the gap between the boards. A ¾ inch gap may be provided for by use of a fastener 100 with the following horizontal dimensions. The top 118, 120 and bottom 114, 116 tabs are preferably approximately 3/32 inch in horizontal thickness. The prongs, for example 110a and 110b, may be approximately 3/64 inch in horizontal thickness, so that upon compression the prongs 110a and 110b will present an overall thickness similar to that of the top tab 118, see FIG. 9. It should be appreciated that the above dimensions may be varied while still yielding a fastener 100 that provides for a ¼ inch gap. In addition, fasteners having other dimensions may be provided if a narrower or wider gap is desired.

Figure 9:
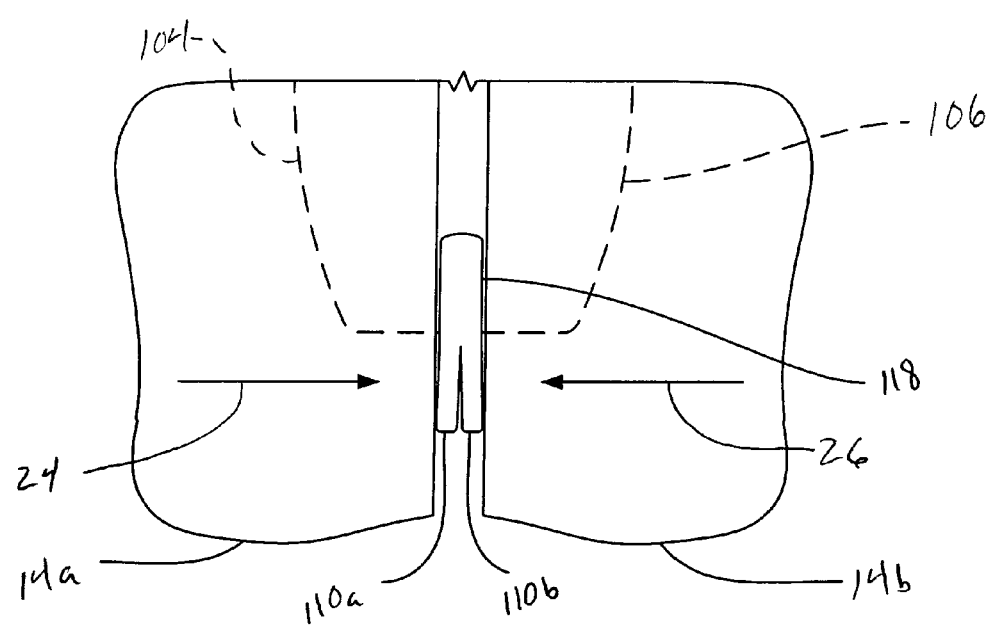
FIG. 9 is a partial, top diagrammatical view of a deck board fastener positioned between adjacent deck boards showing deformation of the compression elements in response to expansion of the deck boards and narrowing of the gap between the boards.

Preferably, the fastener 100 is formed of a resilient material such as plastic. The material chosen should be rigid enough so that the top plate 102 tends to resist flexion when a screw or nail is driven through the center hole 108 into an underlying joist 20 or other substructure. In order to augment the rigidity of the top plate 102, a ridge 122 may be provided on the underside of the top plate 102 such that it joins and is contiguous with bottom tabs 114 and 116. This ridge 122 may be observed in elevation in FIG. 3. While the rigidity of the selected material must be sufficient to resist flexion of the top plate 102, it should not be brittle. Preferably, the fastener 100 should be able to withstand impacts from tools such as hammers, as well as movement of the boards due to footfalls by persons walking over the deck structure, and movement due to shrinking and swelling of the boards themselves. The material selected should be resilient so that upon swelling of boards 14a and 14b, the prongs 110a and 110b can compress inward, as shown in FIG. 9. Arrows 24 and 26 indicate inward movement of boards 14a and 14b due to swelling of the boards caused by environmental factors such as moisture and temperature. Although not necessary for the fastener 100 to be operable, the selected material is preferably of sufficient resiliency so that prongs 110a and 110b will rebound to their original position upon subsequent shrinkage of the adjacent deck boards 14a and 14b.

Figure 10:
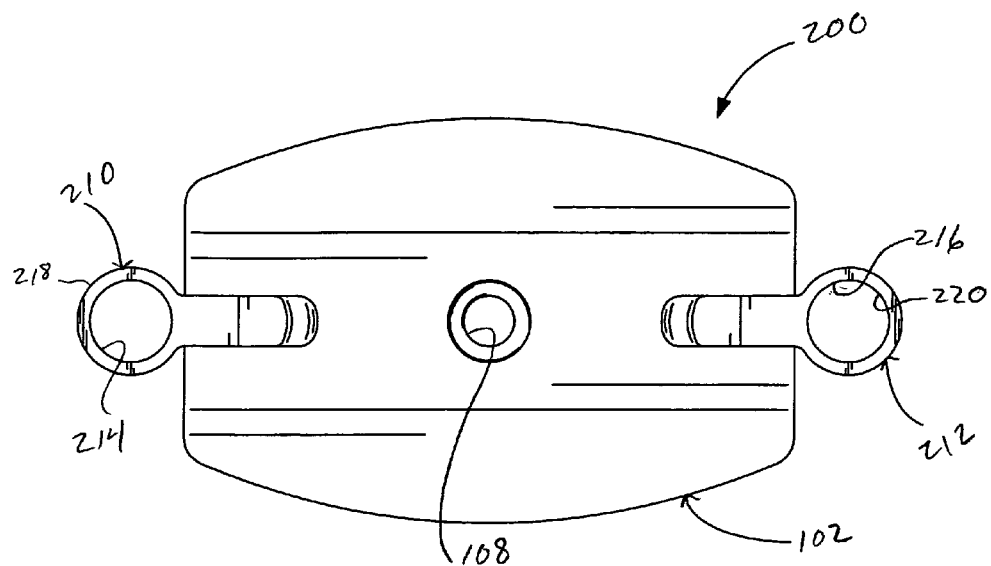
FIG. 10 is a top plan view of a deck board fastener showing an alternative, circular compression element configuration.

FIG. 10 is a top plan view of a deck board fastener 200 having alternative circular compression elements 210 and 212. Compression elements 210 and 212 include central open spaces 214 and 216, respectively, to allow for compression of respective walls 218 and 220. As illustrated, alternative fastener 200 includes a top plate 102 and center hole 108 substantially similar to fastener 100.

Figure 11:
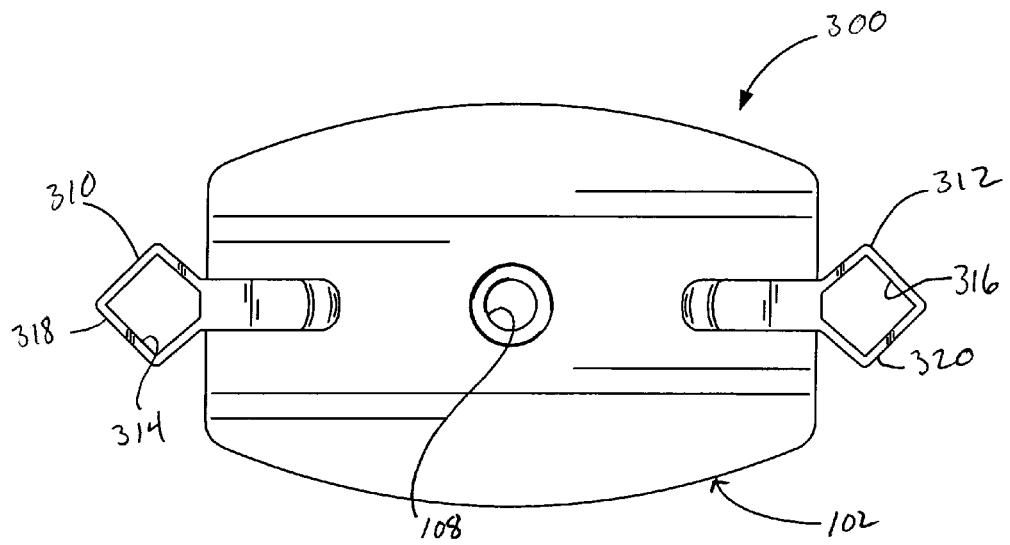
FIG. 11 is a top plan view of a deck board fastener showing an alternative, rectangular compression element configuration.

FIG. 11 is a top plan view of a deck board fastener 300 having alternative rectangular compression elements 310 and 312. Compression elements 310 and 312 include central open spaces 314 and 316, respectively, to allow for compression of respective walls 318 and 320. As illustrated, alternative fastener 300 includes a top plate 102 and center hole 108 substantially similar to fastener 100. Is should be appreciated that compression elements may take other forms than illustrated such as multi-sided or polygon shapes, the controlling factor being the ability to compress in a lateral direction.

Figure 12:
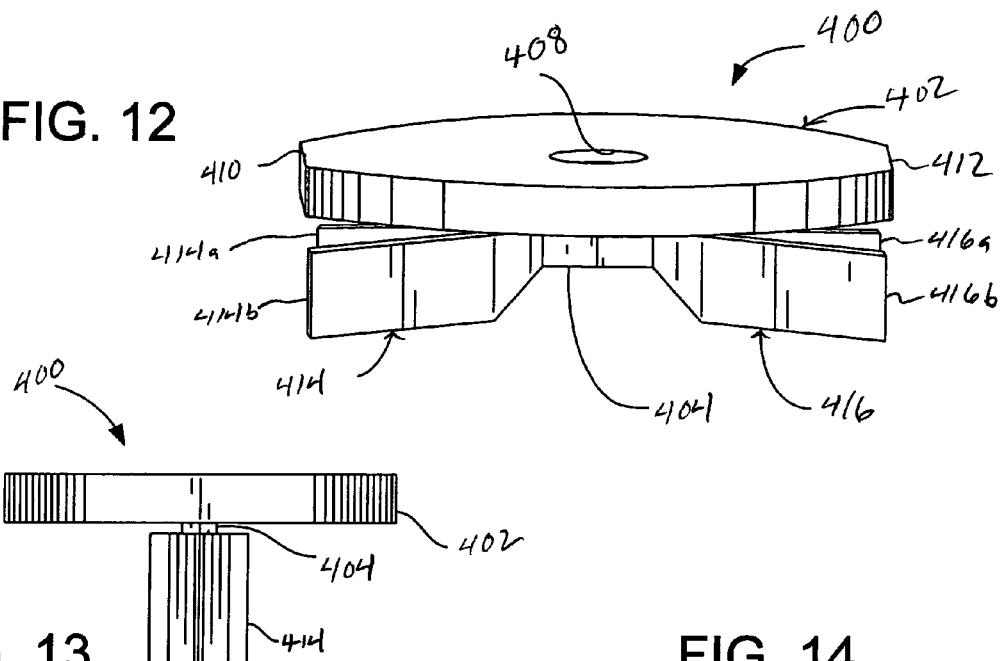
FIG. 12 is a perspective view of an alternative embodiment of a deck board fastener illustrating horizontally diverging compression elements mounted to the undersurface of the top plate.

FIG. 12 is a perspective view of an alternative embodiment of a deck board fastener 400. The fastener 400 includes a top plate 402 and center hole 408 substantially similar to those disclosed in prior embodiments 100, 200 and 300. Rather than compression elements projecting from the longitudinal ends 410 and 412 of the top plate 402, however, fastener 400 includes a pedestal structure 404 projecting downward from the lower, center surface of top plate 402 and enclosing center hole 408. A first compression element 414 projects horizontally outward from pedestal 404 in the direction of end 410. A second compression element 416 projects horizontally outward from pedestal 404 in the direction of end 412. The compression elements 414 and 416 include prongs 414a, 414b, 416a and 416b, as indicated in FIG. 12. Preferably, pairs of prongs, such as 414a and 414b, are spaced so that the device 400 sets a ¼ inch gap between adjacent deck boards.

Figure 13:
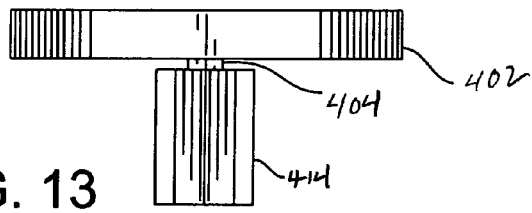
FIG. 13 is an end elevational view of the deck board fastener of FIG. 12.
Figure 14:
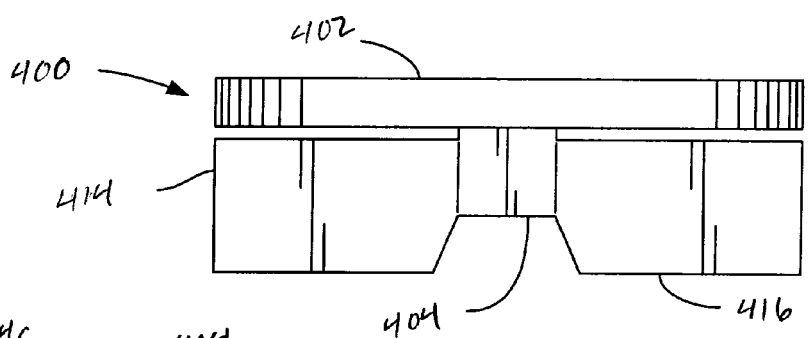
FIG. 14 is a side elevational view of the deck board fastener of FIG. 12.
Figure 15:
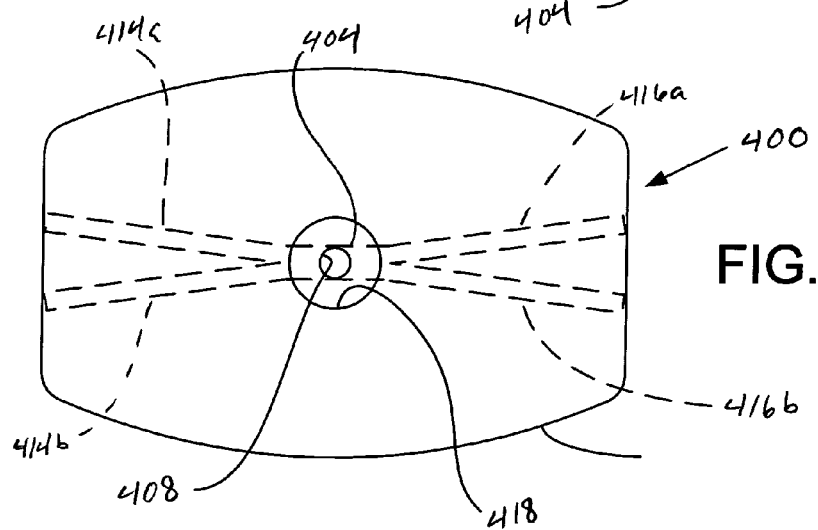
FIG. 15 is a top diagrammatical view of the deck board fastener of FIG. 12 with the compression elements drawn in phantom lines to indicate placement below the top plate.

FIG. 13 is an end elevational view of fastener 400 showing the pedestal 404 connecting the top plate 402 to compression element 414. FIG. 14 is a side elevational view of fastener 400 also showing pedestal 404 projecting from the bottom surface of top plate 402 from which extend compression elements 414 and 416. It should be appreciated the compression elements 414 and 416 are not directly attached to top plate 402. Therefore, fastener 404 also allows for unrestricted inward compression of compression elements 414 and 416 upon swelling of adjacent deck boards. FIG. 15 is a top diagrammatical view of fastener 400, with the pedestal 404, prongs 414a and 414b of compression element 414, and prongs 416a and 416b of compression element 416, drawn in phantom lines to indicate placement of these elements below the top plate 402. As shown, center hole 408 is preferably of a diameter sufficiently large to allow the passage of a nail or screw, and sufficiently small to allow enclosure within pedestal 404. As may also be seen in previous illustrations, the center hole 408 may be bounded on the upper surface of top plate 402 by a circular bevel 418 for receiving the head of a nail or screw.

Figure 16:
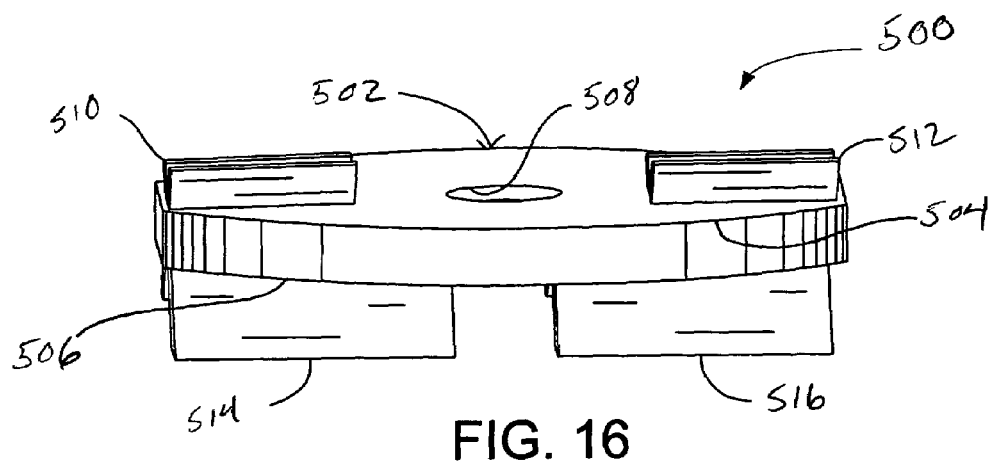
FIG. 16 is a perspective view of an alternative embodiment of a deck board fastener illustrating vertically diverging compression elements mounted to the upper and lower surfaces of the top plate.
Figure 17:
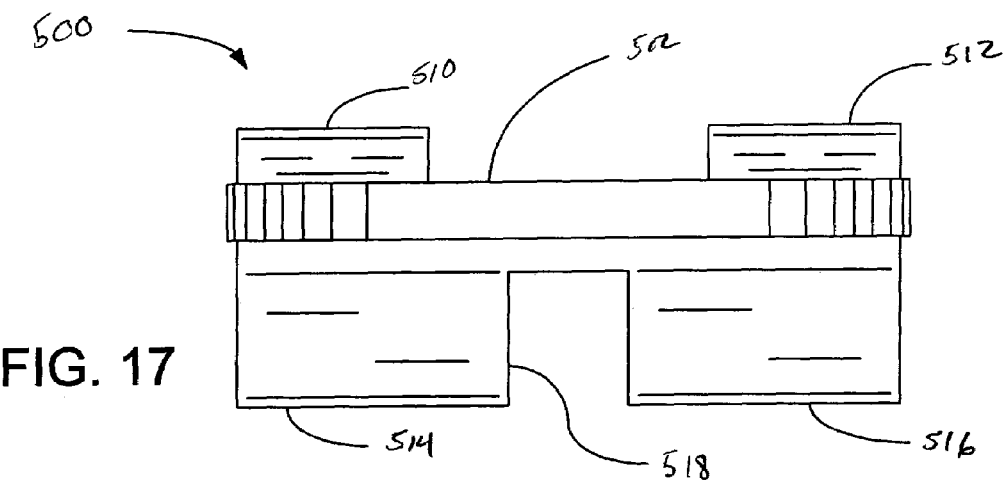
FIG. 17 is a side elevational view of the deck board fastener of FIG. 16.
Figure 18:
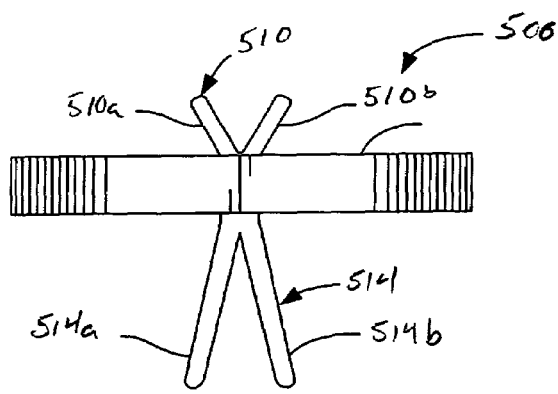
FIG. 18 is an end elevational view of the deck board fastener of FIG. 16.

FIG. 16 is a perspective view of another alternative embodiment of a deck board fastener 500 including compression elements 510 and 512 projecting upward from the top surface 504 of top plate 502, and compression elements 514 and 516 projecting downward from the bottom surface 506 of top plate 502. Unlike previous embodiments, fastener 500 includes compression elements having vertically diverging prongs, such as 510a and 510b, and 514a and 514b, see FIG. 18. As with the prior embodiments, fastener 500 provides a means of fastening adjacent deck boards to an underlying joist, while setting a uniform gap spacing and providing for expansion of the boards and concomitant compression of the gap space-limiting elements, the compression elements. FIG. 17 is a side elevational view of the fastener 500 of FIG. 16. FIGS. 16 and 17 indicate a space 518 between compression elements 514 and 516 to allow for unobstructed travel of a nail or screw and for independent flexion of compression element prongs associated with elements 514 and 516. It should be appreciated that due to the gap between the prongs, such as illustrated in FIG. 18 between prongs 514*a* and 514*b*, elements 514 and 516 could be joined to form a single compression element.

Figure 19:
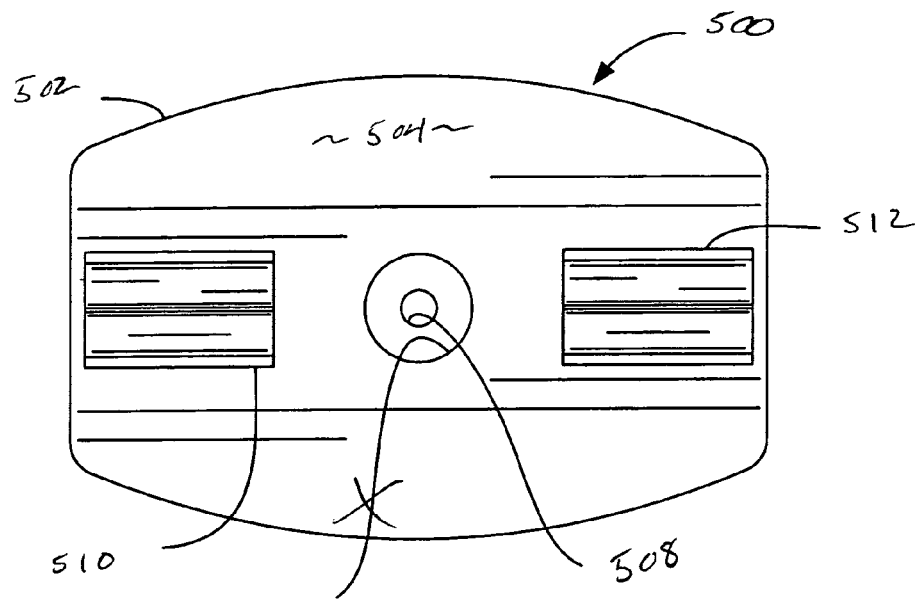
FIG. 19 is a top plan view of the deck board fastener of FIG. 16.
Figure 20:
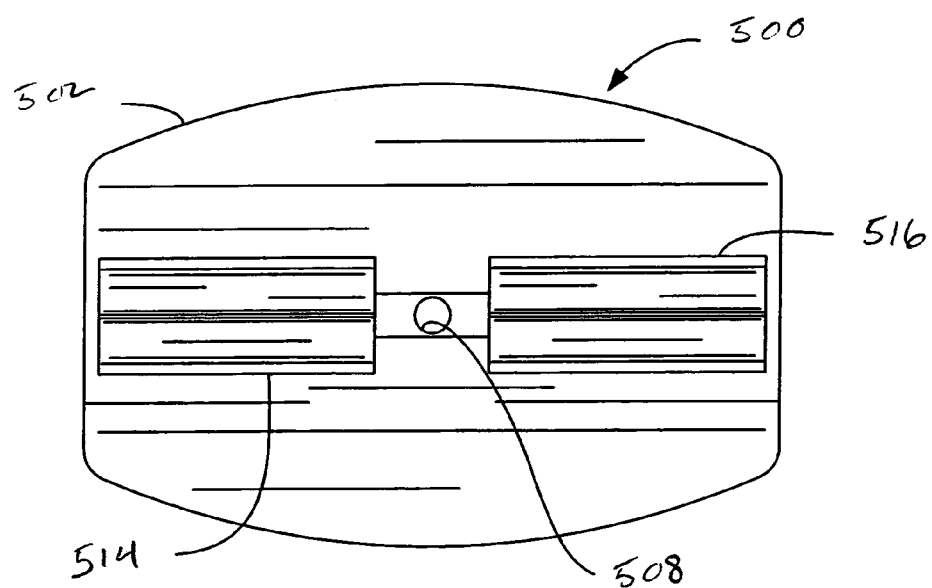
FIG. 20 is a bottom view of the deck board fastener of FIG. 16.

FIG. 19 is a top plan view of fastener 500 showing placement of compression elements 510 and 512 upon the top surface 504 of top plate 502. FIG. 20 is a bottom view of fastener 500 showing placement of compression elements 514 and 516 upon the bottom surface 506 of top plate 502. Although shown in FIG. 16 through 20 as being set back slightly from the longitudinal ends of the top plate 502, it should be appreciated that the compression elements 510, 512, 514 and 516 may extend to the longitudinal ends of the top plate 502, or maybe set back further inward.

It is to be understood that while certain forms of this invention have been illustrated and described, it is not limited thereto except insofar as such limitations are included in the following claims and allowable equivalents thereof.

Having thus described the invention, what is claimed as new and desired to be secured by Letters Patent is as follows:

1. A deck board fastening device for securing deck boards to a support structure, said device comprising:
    a planar top plate portion including a first planar flange and a second planar flange joined together along respective longitudinal edges, each of said planar flanges extending outward in a substantially horizontal plane, the juncture of said planar flanges defining the longitudinal center of said planar top plate portion;
    at least one bottom tab extending downwardly from a bottom surface of said top plate; and
    first and second resilient compression elements extending outwardly from opposite ends of said top plate, each of said compression elements having opposed sides compressible together.

2. The deck board fastening device of claim 1 wherein said compression elements extend from corresponding first and second tabs located adjacent opposite ends of said planar top plate.

3. The deck board fastening device of claim 1 further comprising a pedestal extending downward from the lower, center surface of said top plate, said wherein said compression elements project from said pedestal.

4. The deck board fastening device of claim 1 wherein at least one of said compression elements projects upward from the top surface of said top plate and at least one of said compression elements projects downward from the bottom surface of said top plate.

5. The deck board fastening device of claim 1 wherein said compression elements comprise outwardly diverging prongs.

6. The deck board fastening device of claim 1 wherein said compression elements comprise hollow-centered loops.

7. The deck board fastening device of claim 6 wherein said loops are circular in cross section.

8. The deck board fastening device of claim 6 wherein said loops are rectangular in cross section.

9. The deck board fastening device of claim 6 wherein said loops are polygonal in cross section.

10. A deck board fastening device for securing deck boards to a support structure, said device comprising:
    a planar top plate including a first planar flange and a second planar flange joined together along respective longitudinal edges, each of said planar flanges extending outward in a substantially horizontal plane, the juncture of said planar flanges defining the longitudinal center of said planar top plate, said planar top plate having a first end and a longitudinally opposed second end;
    a hole extending through said planar top plate at the center of said planar top plate;
    a first tab extending downwardly from a bottom surface of said planar top plate in proximity to said first end;
    a second tab extending downwardly from a bottom surface of said planar top plate in proximity to said second end;
    a first resilient compression element projecting from said first tab; and,
    a second resilient compression element projecting from said second tab: said first and second resilient compression elements having opposed sides compressible together.

11. A combination deck board fastening device and plurality of deck boards, comprising:
    a plurality of deck boards, each of said deck boards having slots provided therein;
    at least one fastening device interposed between said plurality of deck boards, said fastening device comprising:
        a planar top plate having a first planar flange at least partially disposed in said slot of one of said deck boards, and a planar second flange at least partially disposed in said slot of another of said deck boards, said first and second planar flanges joined together along respective longitudinal edges, the juncture of said planar flanges defining a longitudinal center of said planar top plate;
        at least one bottom tab extending downwardly from a bottom surface of said planar top plate; and
        first and second resilient compression elements extending outwardly from opposite ends of said planar top plate, said resilient compression elements having opposed sides compressible together for maintaining a spacing between adjacent deck boards while providing for compression and expansion of said deck boards.

12. The combination deck board fastening device and plurality of deck boards of claim 11, wherein said compression elements extend from corresponding first and second tabs located adjacent opposite ends of said planar top plate.

13. The combination deck board fastening device and plurality of deck boards of claim 11, wherein at least one of said compression elements projects upward from a top surface of said top plate and at least one of said compression elements projects downward from the bottom surface of said top plate.

14. The combination deck board fastening device and plurality of deck boards of claim 11, wherein said compression elements comprise outwardly diverging prongs.

15. The combination deck board fastening device and plurality of deck boards of claim 11, further comprising a center hole extending through said top plate, and a fastener receivable in said center hole.

* * * * *